(12) United States Patent
Tadych et al.

(10) Patent No.: US 8,776,930 B2
(45) Date of Patent: Jul. 15, 2014

(54) FAN FOR DRIVE CLUTCH

(75) Inventors: Michael Tadych, St. Hilaire, MN (US); Dustin Keller, Thief River Falls, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 16 days.

(21) Appl. No.: 13/408,781

(22) Filed: Feb. 29, 2012

(65) Prior Publication Data

US 2013/0220766 A1  Aug. 29, 2013

(51) Int. Cl.
*F16H 57/04* (2010.01)

(52) U.S. Cl.
USPC ............................................ 180/182; 474/93

(58) Field of Classification Search
USPC ............................................ 180/182; 474/93
See application file for complete search history.

(56) References Cited

U.S. PATENT DOCUMENTS

| 4,531,928 | A  | * | 7/1985 | Ikenoya | 474/93 |
|---|---|---|---|---|---|
| 5,287,832 | A | * | 2/1994 | Uhl | 123/185.3 |
| 6,314,922 | B1 | * | 11/2001 | Zimmermann et al. | 123/41.65 |
| 6,523,508 | B2 | * | 2/2003 | Husges et al. | 123/41.65 |
| 6,938,508 | B1 | * | 9/2005 | Saagge | 474/93 |
| 7,070,527 | B1 | * | 7/2006 | Saagge | 474/93 |
| 7,845,171 | B2 | * | 12/2010 | Moller et al. | 60/620 |
| 7,859,124 | B2 | * | 12/2010 | Maier et al. | 290/10 |
| 2003/0183187 | A1 | * | 10/2003 | Menzel et al. | 123/192.2 |
| 2008/0223040 | A1 | * | 9/2008 | Moller et al. | 60/623 |
| 2009/0298627 | A1 | * | 12/2009 | Johnson et al. | 474/93 |
| 2011/0107985 | A1 | * | 5/2011 | Gorenflo et al. | 123/41.65 |

* cited by examiner

*Primary Examiner* — Kevin Hurley
*Assistant Examiner* — Michael Stabley
(74) *Attorney, Agent, or Firm* — Lowe Graham Jones PLLC (57) ABSTRACT

A fan for a drive clutch includes a disk having several vanes that can attach to a drive clutch to direct air toward the clutch to cool the clutch and belt of a CVT transmission. The disk can be injection-molded or otherwise formed and can be bolted onto a clutch drive with the vanes facing toward the clutch drive. An inward-facing surface can be concave to direct air toward the clutch. The disk can attach to the clutch drive using preexisting bolts of the clutch drive.

27 Claims, 9 Drawing Sheets

FAN FOR DRIVE CLUTCH

TECHNICAL FIELD

This disclosure relates generally to a fan for use with a drive clutch of a vehicle that rotates with the drive clutch and directs air toward the clutch and the drive belt to cool the belt.

BACKGROUND

Snowmobiles and ATVs generally employ a continuously variable transmission ("CVT") having opposing sheaves and a belt that drives a driven shaft as part of the power transmission. CVTs include a drive clutch and a driven clutch that receives power from the drive clutch. As with many other components of an engine, these components generate heat that can harm engine components. For example, heat is generated due to the friction between the belt and the clutch sheaves. The problem is especially acute with high engine speeds and relatively low vehicle speeds, such as when a mountain snowmobile is riding through deep powder snow or when a utility snowmobile is performing a chore with engine time at idle or slow vehicle speeds. A driven clutch may have cooling vanes that move air to cool the belt as the vanes move. However, the driven clutch does not move when the vehicle idles and moves slower than the drive clutch with a load on the system. Clutch belts can lose strength and optimum stiffness and can even rupture at high temperatures. Running a powered fan is not typically a viable solution for various reasons. Space in an engine compartment is limited, so most engine compartments simply do not have room for a bulky fan and motor. In addition, a motored fan will generate heat itself, which may lessen the overall effect of such a system. Perhaps most importantly, an electric fan would add excessive weight to snowmobiles that manufacturers painstakingly try to keep light. Accordingly, there is a need for a system or method of cooling a CVT belt within certain spatial constraints and without generating additional heat loads.

SUMMARY

In at least one embodiment, the present disclosure is directed to a fan disk for cooling a drive clutch, sheaves, and a belt of a continuously variable transmission ("CVT"). The fan disk comprises an annular body having a central bore, a plurality of vanes extending from an inward-facing surface of the annular body. The vanes extend in a generally outward direction relative to the central bore. The fan disk further comprises an attachment mount to hold the annular disk to a clutch drive of an engine with the inward-facing surface and vanes facing the drive clutch. The annular disk and the vanes rotate with the drive clutch, and the vanes, when rotating, transfer air around the drive clutch.

In other embodiments, the present disclosure is directed to a method of cooling components of a snowmobile. The method includes attaching a fan disk to a drive clutch of the snowmobile. The fan disk has a bore and a plurality of vanes, and the fan disk is oriented with the vanes directing air through the bore and toward the drive clutch. The method continues by cooling the drive clutch by rotating the fan disk and directing air toward the drive clutch.

In still further embodiments, the present disclosure is directed to a snowmobile comprising an engine having a driveshaft, an engine encasement enveloping at least part of the engine, and a drive clutch operably coupled to the driveshaft of the engine. The snowmobile further comprises a driven clutch operably coupled to the drive clutch. As the engine rotates the drive clutch, the drive clutch rotates the driven clutch, and the driven clutch therefore moves the snowmobile. The snowmobile also includes a fan disk attached to the drive clutch, the fan disk having a central bore and a plurality of vanes configured to direct air from outside the engine encasement through the central bore and toward the drive clutch as the fan disk rotates with the drive clutch.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENTS

The present disclosure is directed to a fan disk for a drive clutch of a CVT transmission. The fan disk can be a single, solid piece of plastic or other material, and can have vanes or blades shaped to move air as the fan disk rotates. The fan disk is mounted to a drive clutch to rotate along with the drive clutch. The rotation of the drive clutch causes the vanes to move air toward the drive clutch and CVT belt to cool the belt. Cooling of the drive clutch also cools the belt as they are in constant contact. The fan may also assist in engine cooling with a portion of the air directed toward the engine.

Figure 1A:
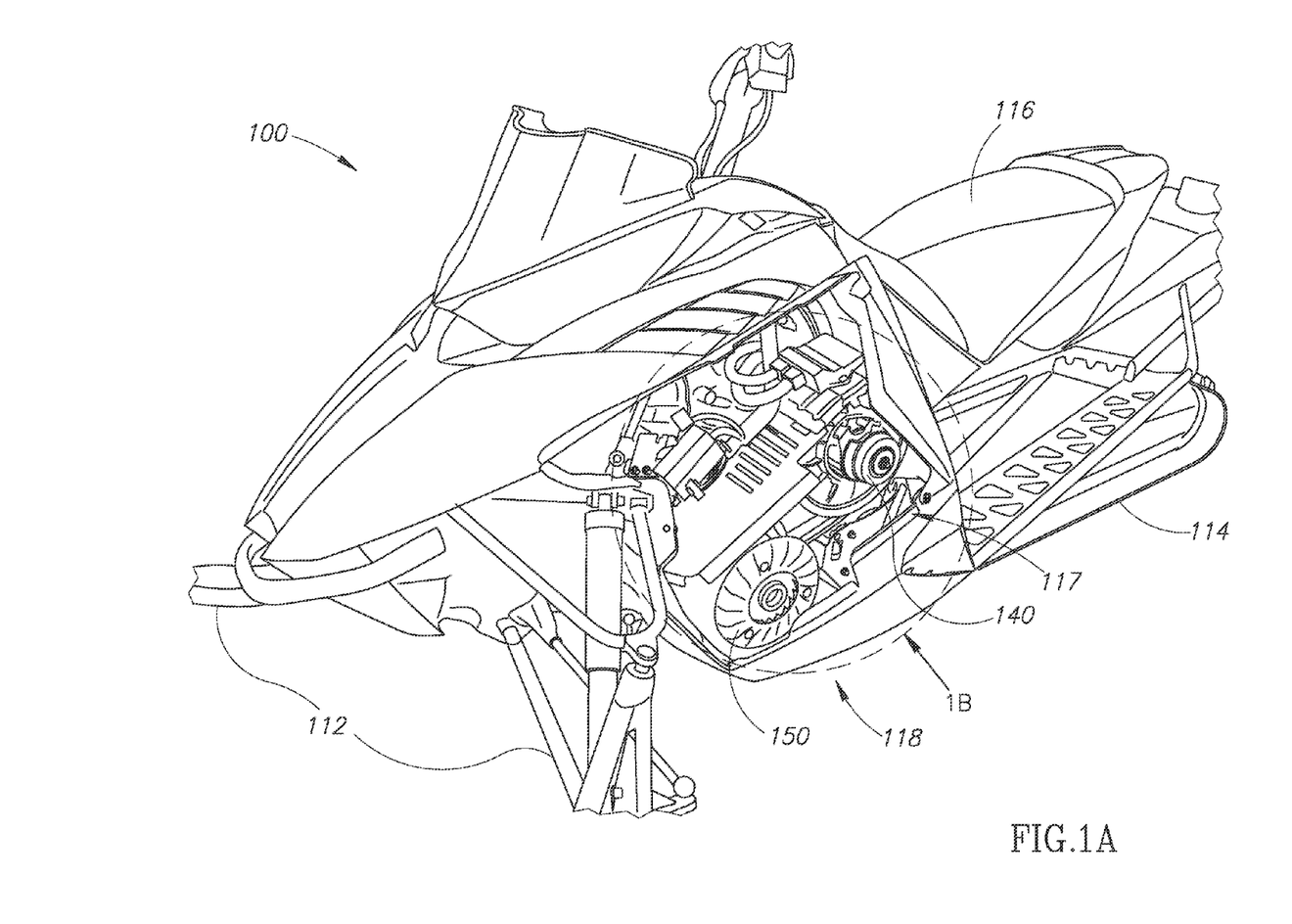
FIG. 1A is a perspective view of a snowmobile according to embodiments of the present disclosure.

FIG. 1A is a front perspective view of a snowmobile 100 according to embodiments of the present disclosure. The snowmobile 100 can include standard snowmobile features, such as skis 112, a track 114, a seat 116, and an engine 118. The systems and methods of the present disclosure are described herein using the snowmobile 100 for conciseness and to avoid obscuring aspects of the present technology; however, the systems and methods of the present disclosure can also be employed on another vehicle, such as but not limited to an all-terrain vehicle or other suitable vehicle that includes a CVT transmission.

Figure 1B:
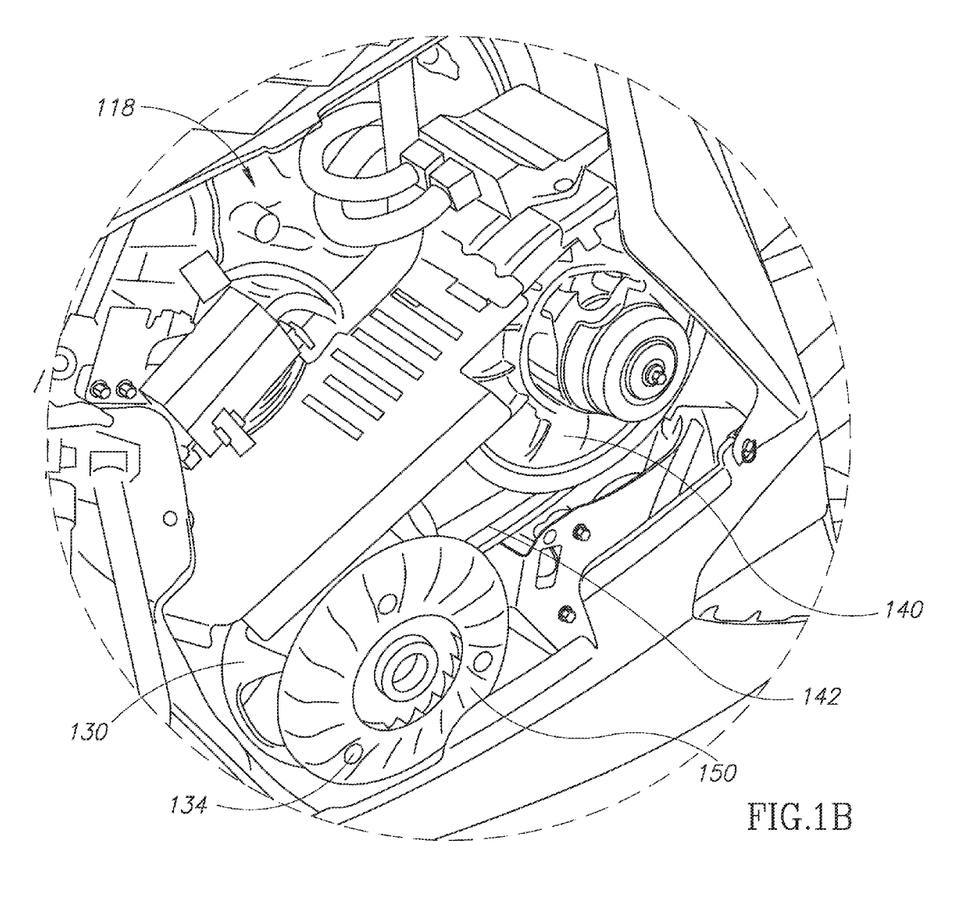
FIG. 1B is an expanded view of a portion of an engine compartment of the snowmobile of FIG. 1A.

FIG. 1B is an expanded view of an engine compartment of the snowmobile 100 of FIG. 1A with a body panel removed. The snowmobile 100 (as shown in FIG. 1A) is powered by the engine 118, and the power is delivered from the engine 118 to the track 114 through a transmission 117 having a drive clutch 130, a driven clutch 140, and a belt 142. According to embodiments of the present disclosure, a fan disk 150 can be attached to the drive clutch 130 to direct air toward portions of the transmission 117 (including the drive clutch 130 and belt 142) and the engine 118 to cool the transmission 117 and the engine 118.

Figure 2:
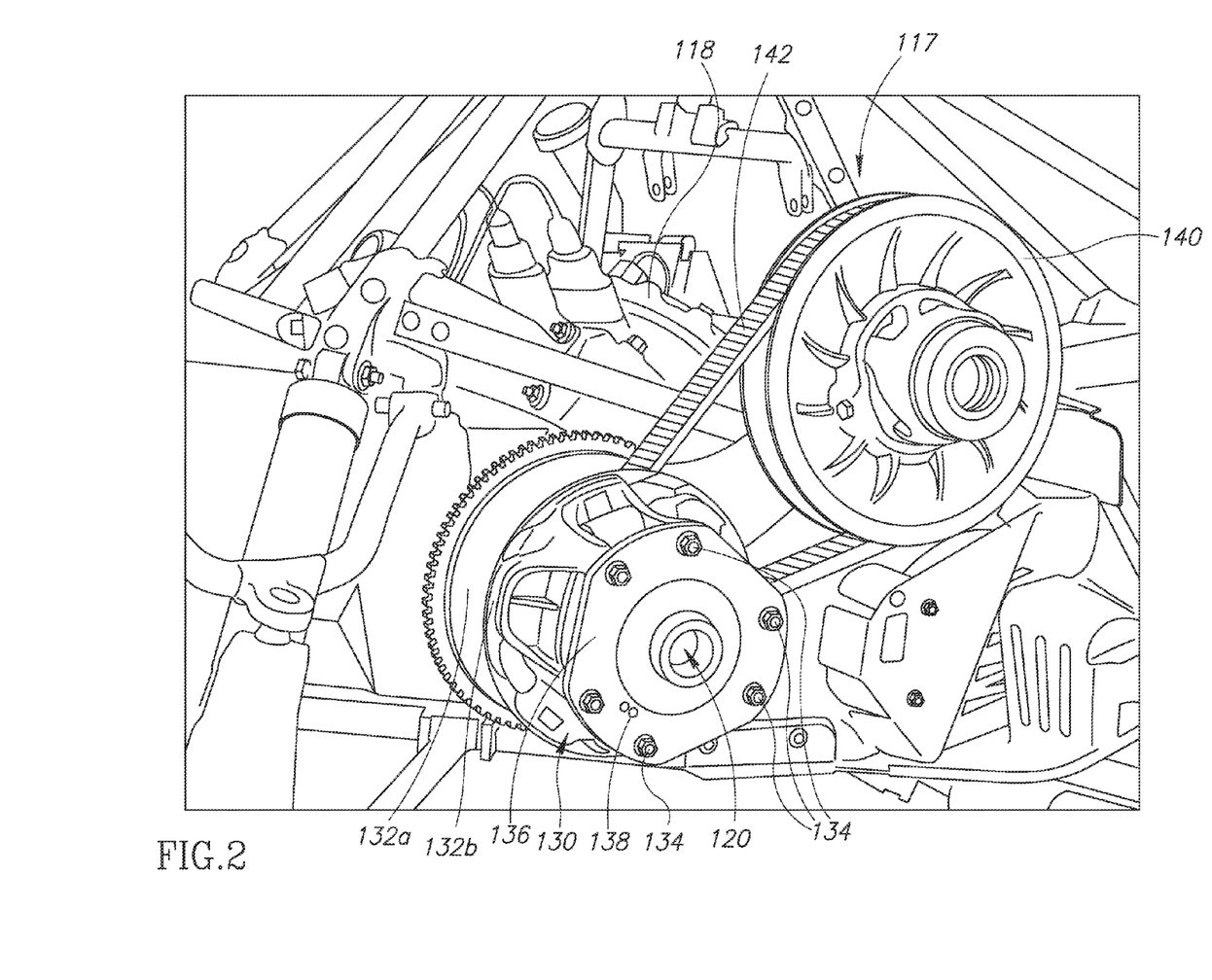
FIG. 2 is a perspective view of a transmission of a snowmobile according to embodiments of the present disclosure.

FIG. 2 illustrates the transmission 117 of the snowmobile 100 according to embodiments of the present technology. The engine 118 can be any suitable type of engine, such as an internal combustion engine, that consumes energy to generate torque on a driveshaft 120. The driveshaft 120 is coupled directly to the drive clutch 130, which is in turn coupled to the driven clutch 140 with a belt 142. The transmission 117 is a CVT commonly used with snowmobiles and other vehicles, as discussed above. The drive clutch 130 of the transmission 117 includes two opposing sheaves 132a, 132b (having conical opposing faces or, more exactly, opposing frustums of cones) arranged point-to-point with the sheaves 132a, 132b holding the belt 142 between them. As the sheaves 132a, 132b move toward and away from one another, the belt 142 engages an outer or inner area of the sheaves 132a, 132b, further from or closer to the axis of driveshaft 120, thereby changing the gear ratio of the transmission 117. The position of the belt 142 on the driven clutch 140 varies somewhat inversely to the position on the drive clutch, as is well known in the industry. Some CVTs, like the one pictured in FIG. 2, change gear ratio as a function of rotational speed of the drive clutch 130 using weights mounted to the drive clutch 130 of the CVT. The location and quantity of the weights can be varied to change the relationship between rotational speed of the drive clutch 130 and the gear ratio. In other embodiments, the sheaves 132a, 132b are actively moved toward and away from one another by a controller and some type of servomotor or solenoid.

In the depicted embodiment, the drive clutch 130 includes a generally flat external face 136 opposite the second sheave 132b and facing away from the transmission 117. The external face 136 can have bolts 134 for holding the drive clutch 130 together, and/or for securing the weights of the drive clutch in place. As the drive clutch 130 rotates, the first and second sheaves 132a, 132b and the external face 136 all rotate. As shown in FIG. 1B, the fan disk 150 can be secured to the external face 136. As the external face 136 rotates, the fan disk 150 will also rotate to direct a flow of cooling air toward the sheaves 132a, 132b and the belt 142, and toward other components of the engine 118.

Figure 3A:
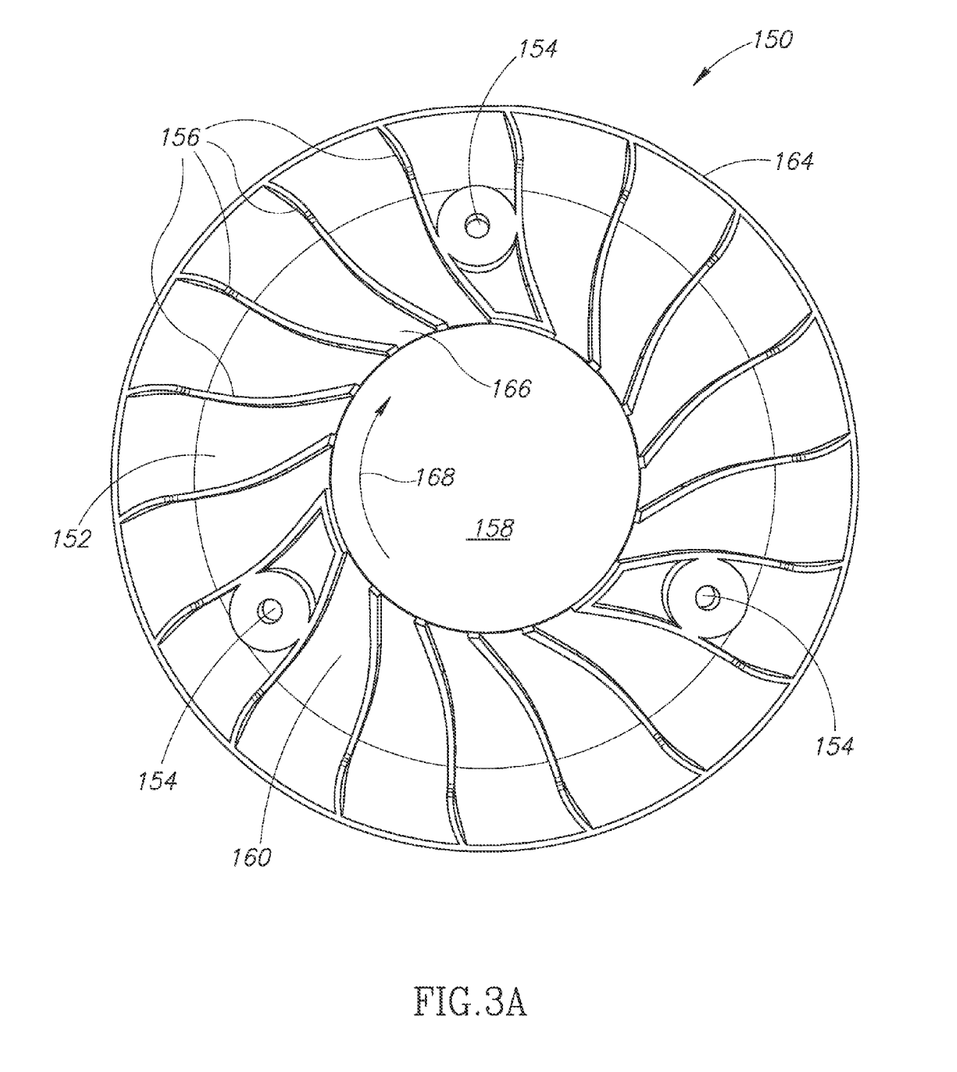
FIG. 3A is an orthogonal view of one side of a fan disk for a drive clutch according to embodiments of the present disclosure.

FIG. 3A is an orthogonal view of the inner side of the fan disk 150 according to embodiments of the present disclosure. When attached to the drive clutch 130, this side faces and contacts the drive clutch 130. The fan disk 150 can have an annular body 152 having an inner rim 166, an outer rim 164, and a central bore 158. The fan disk 150 can have multiple mount points 154 spaced variously around the fan disk 150 to secure the fan disk 150 to the external face 136 of the drive clutch 130. In some embodiments, the mount points 154 are bolt holes positioned according to the bolts 134 of the drive clutch 130. In other embodiments, the fan disk 150 can be secured to the drive clutch 130 in different ways, such as by a clip, a snap-on coupling, or any other suitable fastening mechanism. In some embodiments, the fan disk 150 can be integrally formed with the external face 136. The fan disk 150 can include several vanes 156 with a contoured aerodynamic shape to direct air into the central bore 158 and from the vanes 156 toward the drive clutch 130 to cool the drive clutch 130. In some embodiments, the vanes are generally S-shaped. The fan disk 150 can rotate clockwise as shown by the arrow 168 so that the pitch of the vanes 156 causes the air to flow as desired. In other embodiments, the pitch of the vanes 156 and the rotation direction 168 can be reversed. The fan disk 150 can be a single, solid piece of plastic formed using an injection mold or other suitable method. Alternatively, the fan disk 150 can be metal, composite, or any other suitable material.

Figure 3B:
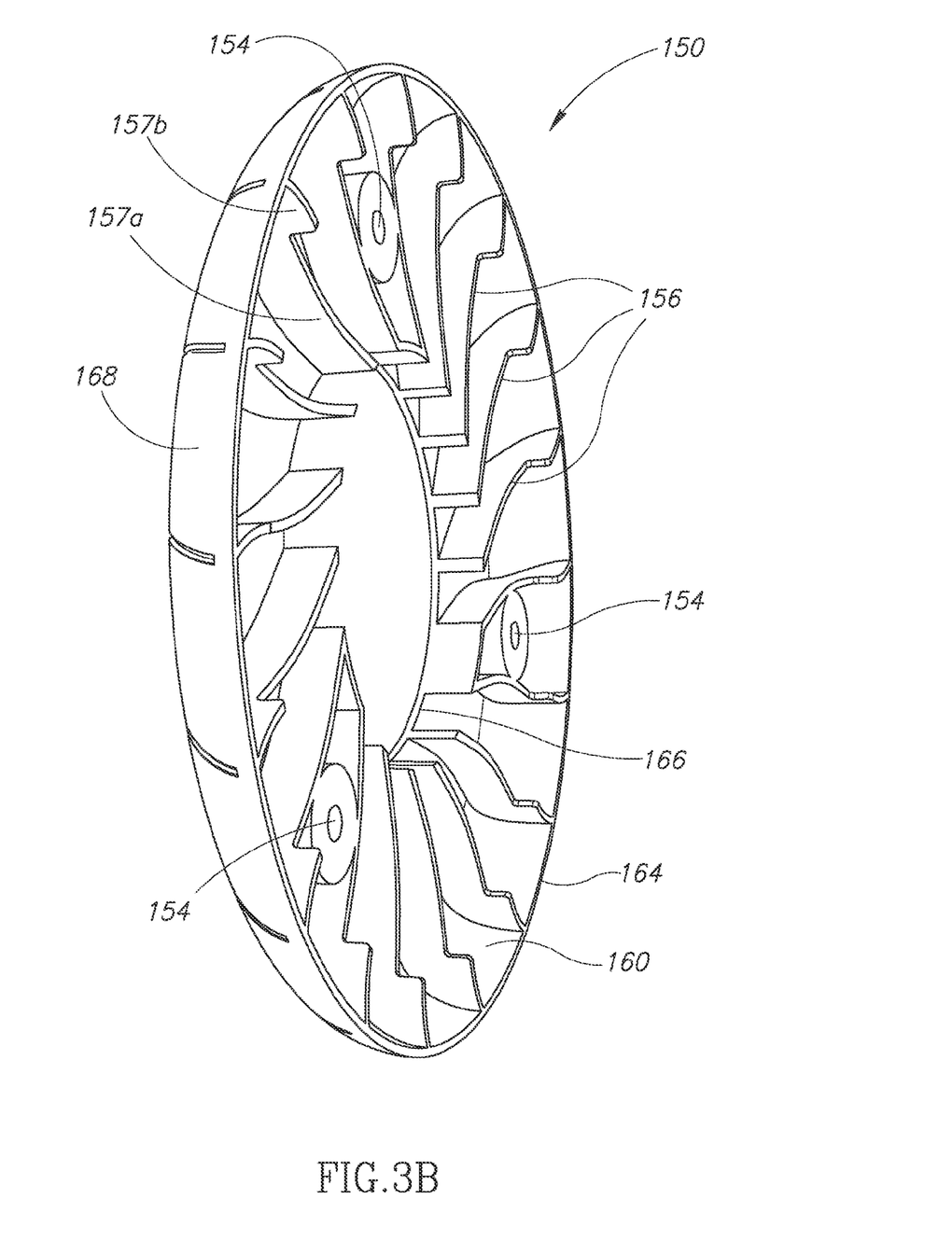
FIG. 3B is a perspective view of the fan disk of FIG. 3A.

FIG. 3B is a perspective of the fan disk 150 of FIG. 3A according to embodiments of the present disclosure. The annular body 152 can have an inward-facing surface 160 (the side shown in FIG. 3A) that faces and contacts the drive clutch 130 when assembled, and an outward-facing surface 162 opposite the inward-facing surface 160. The inward-facing surface 160 can be concave to direct the air from the fan disk 150 toward the drive clutch 130 and other engine components. The annular body 152 can therefore be a dome-shaped ring having a curved perimeter that helps direct the air from the central bore 158 toward the drive clutch 130. The vanes 156 extend from the inward-facing surface 160. The vanes 156 can have a short portion 157a and a long portion 157b. The edge of the short portion 157a contacts the external face 136 of the drive clutch 130, and the long portion 157b extends slightly beyond the external face 136. The shape of the vanes 156 can vary according to the shape of a given external face 136 of a drive clutch 130. For example, the external face 136 may have a rounded shape or any other suitable shape, and the vanes 156 can have a corresponding shape. In other words, the fan disk 150 and vanes 156 can have a recess on the inward-facing surface 160 shaped to receive a portion of the drive clutch 130, such as the external face 136.

Figure 3C:
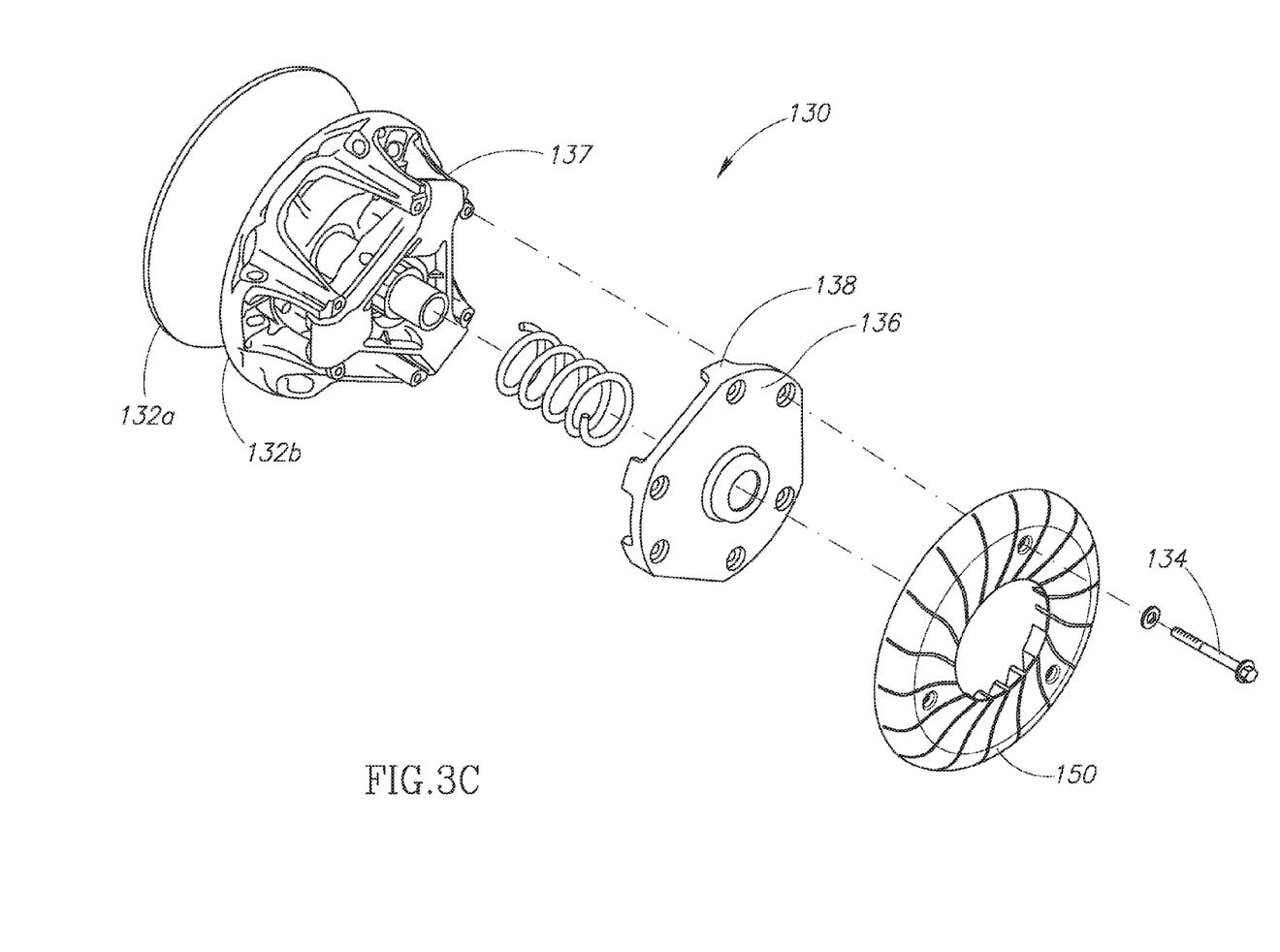
FIG. 3C is a perspective exploded view of the drive clutch and fan disk of FIG. 3A.

FIG. 3C is an isometric exploded view of the drive clutch 130 and fan disk 150 according to embodiments of the present disclosure. The fan disk 150 can be mounted to the external face 136 of the drive clutch 130 with the bolts 134. The fan disk 150 contacts the external face 130 and directs air through the fan disk 150 and toward the drive clutch 130. The second sheave 132b of the drive clutch 130 can include a main body 137 and an exterior plate 138, and the external face 136 can be on the exterior plate 138. The bolts 134 can hold together the second sheave 132b, the exterior plate 138, and the fan disk 150. In alternate embodiments, the exterior plate 138 and the fan disk 150 are integrally formed. In other words, the exterior plate 138 can be formed to have vanes that direct air toward the belt 142 when the drive clutch 130 rotates.

Figure 3D:
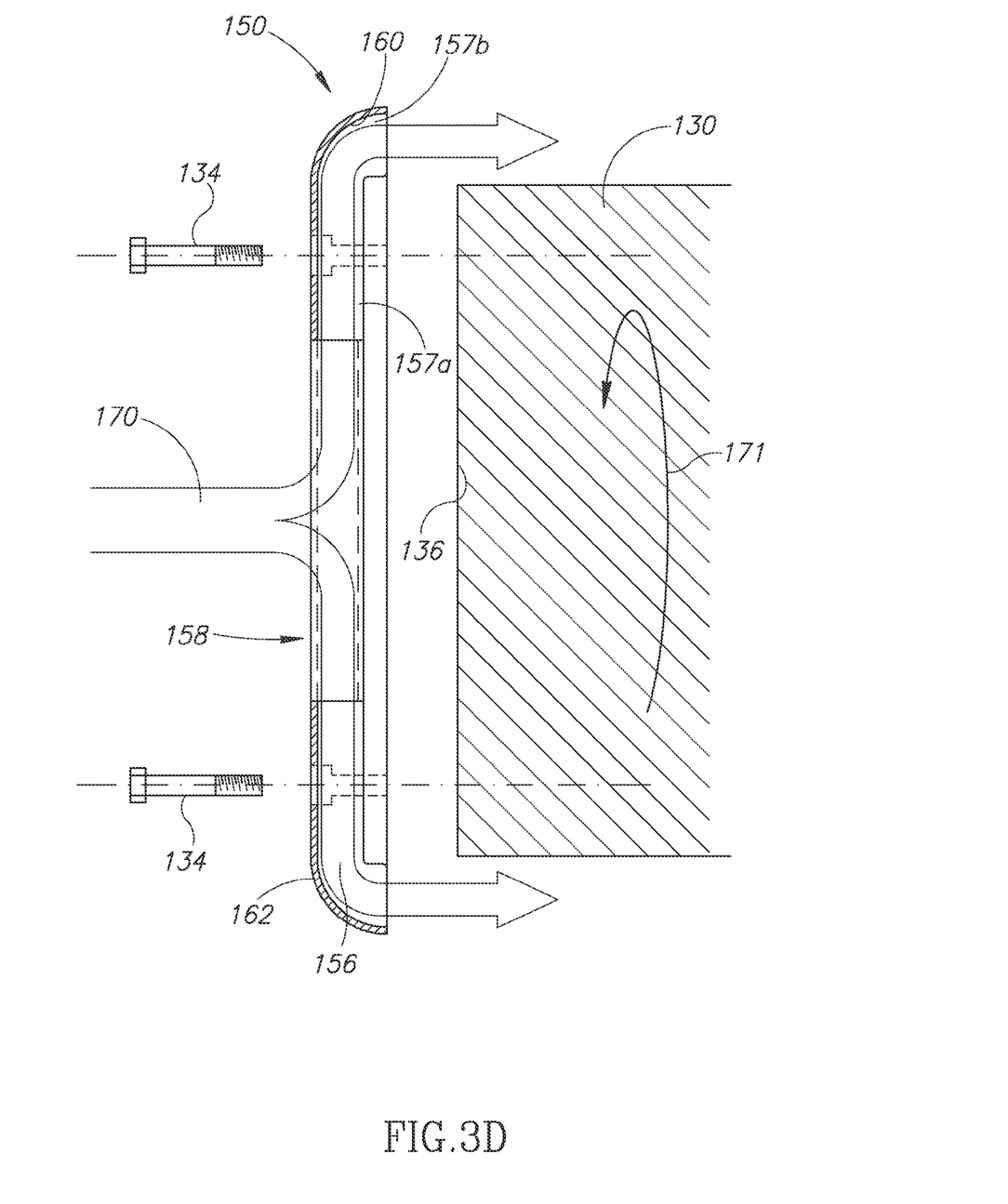
FIG. 3D is an orthogonal cross-sectional exploded view of the drive clutch and fan disk of FIG. 3A.

FIG. 3D is a cross-sectional exploded view of the drive clutch 130 and fan disk 150 according to embodiments of the present disclosure that shows the flow of air through the fan disk 150. As described above, the fan disk 150 can be mounted to the external face 136 of the drive clutch 130 with the bolts 134. The short portion 157a of the vanes 156 can contact the external face 136, and the long portion 157b can extend beyond the external face 136. As the drive clutch 130 and fan disk 150 rotate as shown by arrow 171, the fan disk 150 pulls the air flow 170 into the central bore 158, radially outwardly between the vanes 156, and then along the inward-facing surface 160 and the long portion 157b of the vanes 156 to direct the air axially toward the drive clutch 130 and belt 142. As described above, the shape of the vanes 156 can match any given shape of the drive clutch 130. In some embodiments, the short portion 157a can be approximately ½ inch tall, and the long portion can be ¾ inch tall. The inward-facing surface 160 can be concave with a radius of approximately ½ inch. The diameter of the fan disk 150 can be approximately 8 inches, and the diameter of the central bore 158 can be approximately 4 inches. The dimensions may vary as needed to accommodate a larger or smaller drive clutch 130, or to vary the airflow, or as space within the snowmobile 100 permits.

Figure 3E:
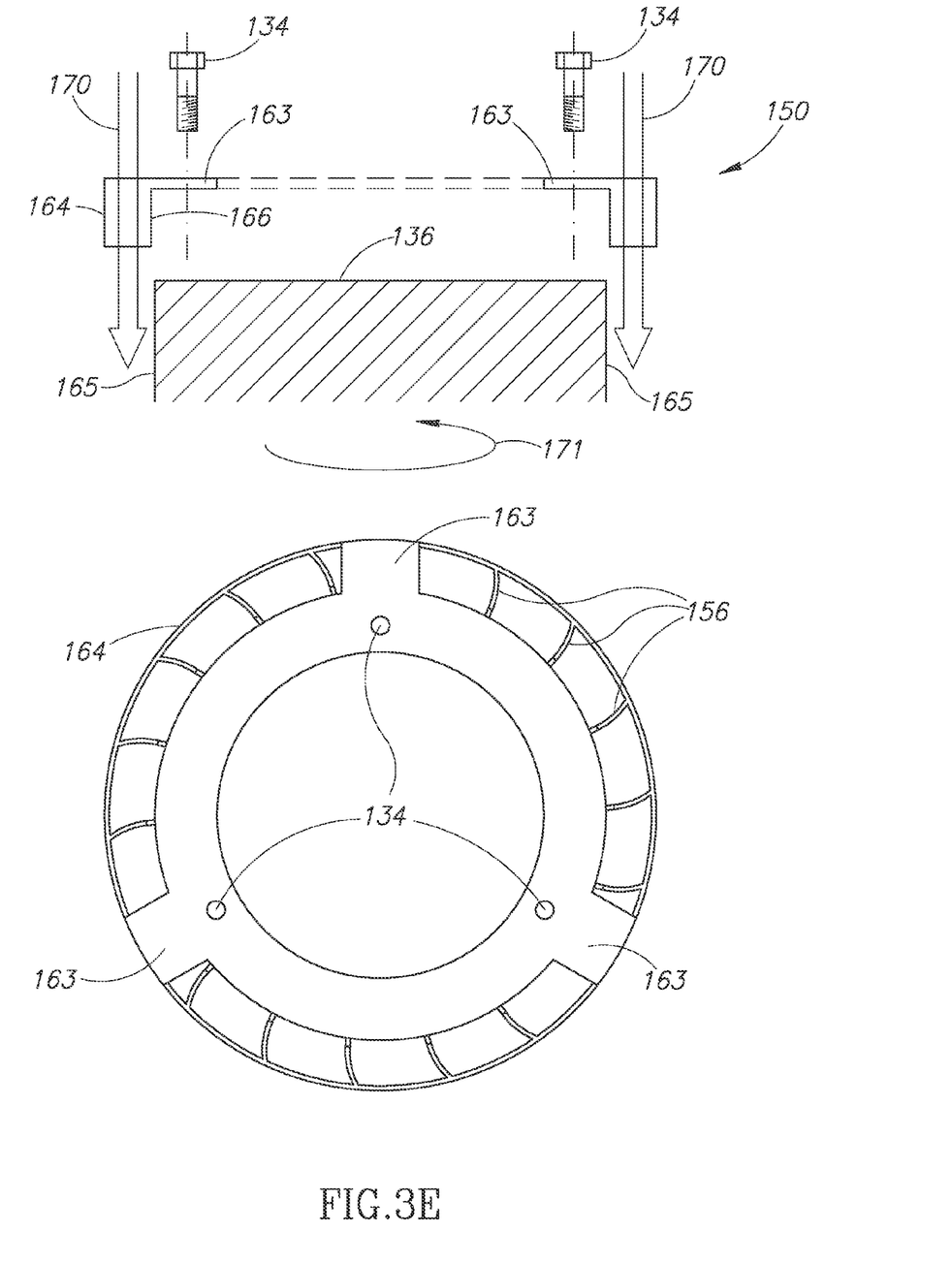
FIG. 3E is an orthogonal cross-sectional exploded view and a top view of a fan disk according to embodiments of the present disclosure.

FIG. 3E illustrates another embodiment of the present disclosure including an annular disk 150 and vanes 156. In this embodiment, the disk 150 includes tabs 163 that engage the external face 136 of the drive clutch 130 and include engagement portions for securing to the external face 136 such as by the bolts 134. The annular disk 150 can also have an outer rim 164 connected to the vanes 156. The vanes 156 can extend from the tabs 163 along a side of the drive clutch 130. The space between the tabs 163 can intake air from within the engine compartment and/or from outside the engine compartment and circulate the air toward the drive clutch 130.

In still other embodiments, the annular disk 150 can include an inner rim 166, an outer rim 164, and the vanes 156. The inner rim 164 can be secured to a side 165 of the drive clutch 130. Therefore, the disk 150 can be positioned around the drive clutch 130 rather than secured to and protruding at least partially from the external face 136. This arrangement may yield a better fit within an engine compartment where space is limited.

Figure 4:
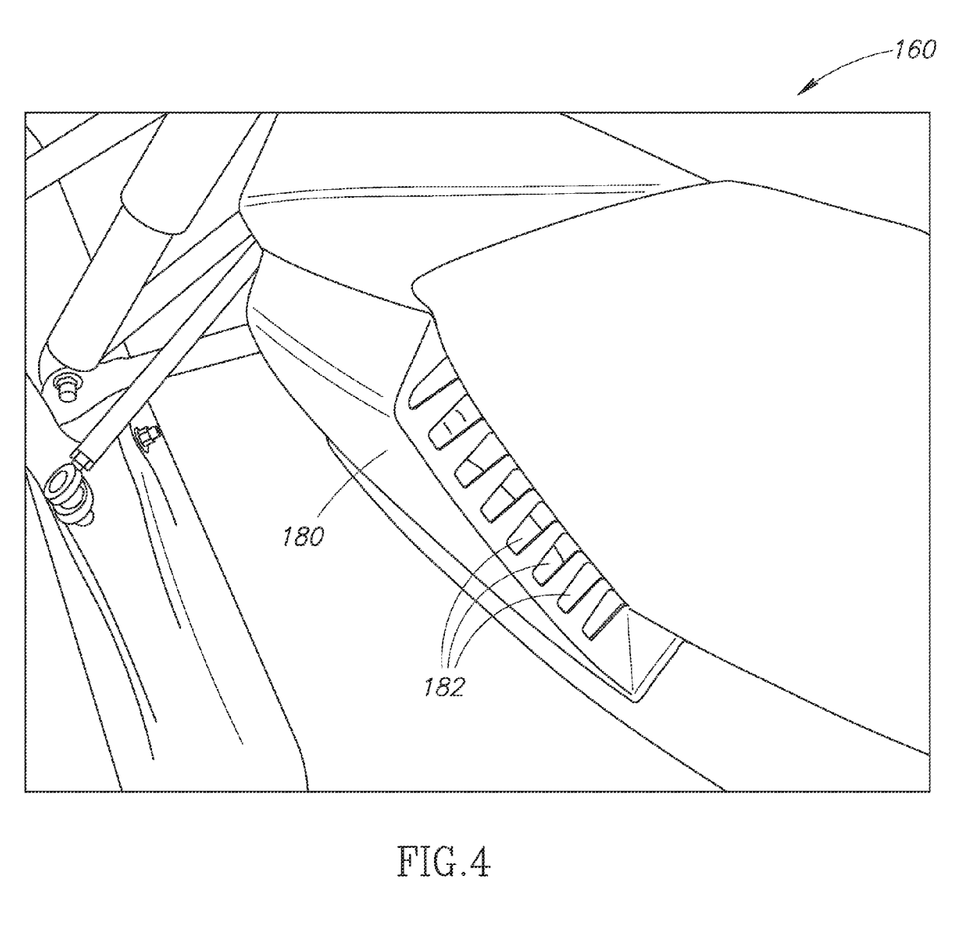
FIG. 4 is a perspective view of a snowmobile having an engine encasement with a vent according to embodiments of the present disclosure.

FIG. 4 illustrates a snowmobile 100 having an engine encasement 180 that envelops all or part of the engine 118. In some embodiments, the engine encasement 180 includes a vent 182 placed generally near the drive clutch 130 of previous figures. The vent 182 therefore permits the fan disk 150 to draw air from outside the snowmobile 100 and to direct the air toward the transmission 117, including the drive clutch 130, the driven clutch 140, the belt 142, and other components of the engine 118 to cool these components. Cooling the sheaves 132 of the drive clutch 130 will also help to keep the belt 142 cool.

While the preferred embodiments of the invention have been illustrated and described, as noted above, many changes can be made without departing from the spirit and scope of the present technology. Accordingly, the scope of the present technology is not limited by the disclosure of the preferred embodiments. Instead, the present technology should be determined entirely by reference to the claims that follow.

The embodiments of the present technology in which an exclusive property or privilege is claimed are defined as follows:

1. A fan disk for cooling a drive clutch, sheaves, and a belt of a continuously variable transmission, the fan disk comprising:
    an annular body having a bore;
    a plurality of vanes extending from the annular body, the vanes extending in a generally outward direction relative to the bore; and
    an attachment mount to hold the annular disk to a clutch drive of an engine with the vanes facing the drive clutch, wherein the annular disk has a larger diameter than the clutch drive and the annular disk and the vanes rotate with the drive clutch, and wherein the vanes, when rotating, transfer air around the drive clutch.

2. The fan disk of claim 1, wherein the vanes are contoured vanes.

3. The fan disk of claim 1, wherein the vanes are configured to draw air through the bore and out from an inward-facing surface of the fan disk toward the sheaves and belt of the transmission.

4. The fan disk of claim 1, wherein the bore is located centrally upon the fan disk.

5. The fan disk of claim 1, wherein the contoured vanes have a contour that substantially matches a shape of the drive clutch, and wherein the contoured vanes and an external face of the drive clutch define an airflow path from the central bore, between the contoured vanes, and toward the drive clutch sheaves.

6. The fan disk of claim 1, wherein the inward-facing surface is concave.

7. The fan disk of claim 1, wherein the annular body and vanes have a recess that fits over the drive clutch.

8. The fan disk of claim 1, wherein the contoured vanes are generally S-shaped.

9. The fan disk of claim 1, wherein the drive clutch is directly coupled to the driveshaft of an engine.

10. The fan disk of claim 1, wherein the attachment mount includes three bolt holes equally spaced about the circumference of the fan disk.

11. The fan disk of claim 1, wherein the attachment mount affixes the fan disk to the drive clutch using preexisting bolt holes of the drive clutch.

12. The fan disk of claim 1, wherein the plurality of contoured vanes comprises 18 similar contoured vanes spaced generally equally around a circumference of the fan disk.

13. The fan disk of claim 1, wherein the fan disk is approximately 8 inches in diameter, and the central bore is approximately 4 inches in diameter.

14. The fan disk of claim 1, wherein the annular disk is formed of a sheet of material approximately ⅛ inch in thickness.

15. The fan disk of claim 1, wherein the annular disk has an inward facing surface that cooperates with the vanes to direct the air toward the drive clutch.

16. A method of cooling components of a snowmobile, the method comprising:
    attaching a fan disk to a drive clutch of the snowmobile such that the drive clutch is positioned between the fan disk and an engine of the snowmobile, wherein the fan disk has a bore and a plurality of vanes extending from an inner surface of the fan disk toward the drive clutch, and wherein the fan disk is oriented with the vanes directing air through the bore and toward the drive clutch; and
    cooling the drive clutch by rotating the fan disk and directing air toward the drive clutch.

17. The method of claim 16, wherein attaching the fan disk to the drive clutch comprises fixedly attaching the fan disk to the drive clutch such that the fan disk rotates with the drive clutch.

18. The method of claim 16, wherein cooling the drive clutch by rotating the fan disk comprises directing air from outside the snowmobile toward the drive clutch.

19. The method of claim 16, wherein directing air toward the drive clutch comprises drawing air into the central bore, directing the air between the vanes and an external face of the drive clutch, and directing the air from the fan disk toward the drive clutch.

20. The method of claim 16, wherein the drive clutch comprises sheaves and a belt, and wherein cooling the drive clutch comprises cooling sheaves and a belt of the drive clutch.

21. A transmission system comprising:
    an engine having a driveshaft;
    a drive clutch operably coupled to the driveshaft of the engine;
    a driven clutch operably coupled to the drive clutch, wherein the engine rotates the drive clutch, wherein the drive clutch rotates the driven clutch, and wherein the driven clutch therefore moves the snowmobile; and
    a fan disk attached to an outboard surface of drive clutch such that the drive clutch is positioned between the engine and the fan disk, the fan disk defining an outer surface and a central bore extending through the fan disk, the fan disk further having a plurality of fins extending from an inner surface opposite the outer surface, the inner surface facing the drive clutch having the vanes positioned between the outboard surface and the inner surface.

22. The transmission system of claim 21, wherein the drive clutch includes an inner sheave and an outer sheave positioned such that the inner sheave is positioned between the outer sheave and the engine, the inner and outer sheaves each defining an inner surface, the inner surfaces of the inner and outer sheaves facing one another and engaging a drive belt, the inner surface of the fan disk facing an outer surface of the outer sheave, the outer surface of the outer sheave being opposite the inner surface thereof.

23. The transmission system of claim 22, wherein drive clutch further comprises a weight assembly secured to the outer sheave having the inner and outer sheaves positioned between the weight assembly and the engine, the fan disk being secured to the weight assembly.

24. The transmission system of claim 23, wherein the weight assembly secures to the outer sheave by means of bolts defining a bolt pattern, the fan disk defining holes according to the bolt pattern, the weight assembly and the fan disk being secured to the outer sheave by means of the bolts.

25. The transmission system of claim 24, wherein the weight assembly includes an outer plate positioned outboard of the outer sheave and weights of the weight assembly, the bolts securing the outer plate and fan disk to the outer sheave having the fan disk outboard of the outer plate, the fan disk and outer plate defining an air channel directing air from the central bore toward the inner and outer sheaves.

26. The transmission system of claim 25, wherein the plurality of fins each include a short portion and a long portion, the short portion positioned closer to the central bore than the long portion and extending outwardly from the inner surface of the fan disk less than the long portion, the short portions defining a recess sized to receive the outer plate.

27. A fan disk for cooling a drive clutch, sheaves, and a belt of a continuously variable transmission, the fan disk comprising:
an annular body having a bore;
a plurality of vanes extending from the annular body, the vanes extending in a generally outward direction relative to the bore, wherein the annular body and the vanes have a recess that fits over the drive clutch; and
an attachment mount to hold the annular disk to a drive clutch of an engine with the vanes facing the drive clutch, wherein the annular disk and the vanes rotate with the drive clutch, and wherein the vanes, when rotating, transfer air around the drive clutch.

* * * * *